(12) United States Patent
Kim

(10) Patent No.: US 8,217,327 B2
(45) Date of Patent: Jul. 10, 2012

(54) APPARATUS AND METHOD OF OBTAINING DEPTH IMAGE

(75) Inventor: Seong Jin Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 681 days.

(21) Appl. No.: 12/379,255

(22) Filed: Feb. 17, 2009

(65) Prior Publication Data

US 2010/0051836 A1 Mar. 4, 2010

(30) Foreign Application Priority Data

Aug. 27, 2008 (KR) ........................ 10-2008-0083914

(51) Int. Cl.
*G01N 21/49* (2006.01)
(52) U.S. Cl. ..................................... 250/208.1; 356/5.01
(58) Field of Classification Search ............... 250/208.1; 345/158, 156; 348/162, 164, 169; 356/4.07, 356/5.01, 12; 382/106, 154
See application file for complete search history.

(56) References Cited

U.S. PATENT DOCUMENTS

| | | | | | |
|---|---|---|---|---|---|
| 5,852,672 | A | * | 12/1998 | Lu | 382/154 |
| 6,144,366 | A | * | 11/2000 | Numazaki et al. | 345/156 |
| 6,324,296 | B1 | * | 11/2001 | McSheery et al. | 382/107 |
| 6,535,275 | B2 | * | 3/2003 | McCaffrey et al. | 356/5.08 |
| 7,283,213 | B2 | * | 10/2007 | O'Connor et al. | 356/5.11 |
| 7,379,163 | B2 | * | 5/2008 | Rafii et al. | 356/4.07 |
| 7,408,627 | B2 | * | 8/2008 | Bamji et al. | 356/5.01 |
| 7,710,391 | B2 | * | 5/2010 | Bell et al. | 345/156 |
| 7,711,179 | B2 | * | 5/2010 | Knighton et al. | 382/154 |
| 7,718,946 | B2 | * | 5/2010 | Kang et al. | 250/208.1 |
| 7,791,715 | B1 | * | 9/2010 | Bamji | 356/5.1 |
| 7,994,465 | B1 | * | 8/2011 | Bamji et al. | 250/214 R |
| 2005/0162381 | A1 | * | 7/2005 | Bell et al. | 345/156 |
| 2005/0237581 | A1 | * | 10/2005 | Knighton et al. | 358/473 |
| 2006/0176467 | A1 | * | 8/2006 | Rafii et al. | 356/4.07 |
| 2006/0176469 | A1 | * | 8/2006 | O'Connor et al. | 356/5.11 |
| 2006/0197937 | A1 | * | 9/2006 | Bamji et al. | 356/5.01 |
| 2006/0220910 | A1 | * | 10/2006 | Becker et al. | 340/932.2 |
| 2006/0241371 | A1 | * | 10/2006 | Rafii et al. | 600/407 |
| 2006/0252477 | A1 | * | 11/2006 | Zalewski et al. | 463/7 |
| 2008/0080789 | A1 | * | 4/2008 | Marks et al. | 382/296 |
| 2008/0186470 | A1 | * | 8/2008 | Hipp | 356/5.08 |
| 2008/0220867 | A1 | * | 9/2008 | Zalewski et al. | 463/37 |
| 2008/0231835 | A1 | * | 9/2008 | Iizuka | 356/72 |
| 2009/0114802 | A1 | * | 5/2009 | Kang et al. | 250/226 |
| 2009/0122146 | A1 | * | 5/2009 | Zalewski et al. | 348/169 |
| 2010/0020209 | A1 | * | 1/2010 | Kim | 348/294 |
| 2010/0051836 | A1 | * | 3/2010 | Kim | 250/574 |
| 2010/0106026 | A1 | * | 4/2010 | Benaron et al. | 600/476 |
| 2010/0128129 | A1 | * | 5/2010 | Kim | 348/164 |
| 2010/0290674 | A1 | * | 11/2010 | Kim | 382/106 |
| 2010/0309201 | A1 | * | 12/2010 | Lim et al. | 345/419 |
| 2011/0025893 | A1 | * | 2/2011 | Kim et al. | 348/294 |
| 2011/0188028 | A1 | * | 8/2011 | Hui et al. | 356/5.01 |
| 2011/0198481 | A1 | * | 8/2011 | Kim et al. | 250/208.1 |
| 2011/0230266 | A1 | * | 9/2011 | Yamaguchi | 463/36 |

* cited by examiner

*Primary Examiner* — John Lee
(74) *Attorney, Agent, or Firm* — Staas & Halsey LLP

(57) ABSTRACT

An apparatus for obtaining a depth image. A first ray emission unit emits a first emission ray, a second ray emission unit emits a second emission ray, a receiving unit receives a first reflection ray associated with the first emission ray and a second reflection ray associated with the second emission ray, and a processing unit calculates a depth value corresponding to a first pixel, based on an electric charge provided from the first pixel of the receiving unit.

25 Claims, 11 Drawing Sheets

TOF VS CHARGE

APPARATUS AND METHOD OF OBTAINING DEPTH IMAGE

CROSS-REFERENCE TO RELATED APPLICATIONS

This application claims the benefit of Korean Patent Application No. 10-2008-0083914, filed on Aug. 27, 2008, in the Korean Intellectual Property Office, the disclosure of which is incorporated herein by reference.

BACKGROUND

1. Field

Example embodiments relate to an apparatus and method of obtaining a depth image, and more particularly, to an apparatus and method of obtaining a depth image which may accurately measure a long maximum measurement distance.

2. Description of the Related Art

Currently, information about a three-dimensional (3D) image is widely used in a variety of applications. In general, 3D information includes geometry information and color information.

Geometry information may be obtained using a depth image. A depth image may be indirectly obtained using software called computer vision technology, or directly obtained using a hardware device such as a depth camera.

A method of measuring a Time of Flight (TOF), which is the time taken for an emitted ray to be reflected back from an object, is widely used as a method of obtaining a depth image of a depth camera.

The method of obtaining a depth image may include direct and indirect methods. In the direct method, a time when a reflection ray reaches a receiving unit is sensed using an element sensitive to light, such as a Single Photon Avalanche Photodiode (SPAD), which is used to measure a TOF. In the indirect method, a phase difference of when pulse light modulated using a photodiode is reflected back is detected as a charge.

In the indirect method, when a pulse width uses a great amount of light, a maximum measurement distance increases and a precision of a depth image decreases. When a pulse width uses a small amount of light, a precision of a depth image increases and a maximum measurement distance decreases.

SUMMARY

Additional aspects and/or advantages will be set forth in part in the description which follows and, in part, will be apparent from the description, or may be learned by practice of the invention.

Example embodiments may provide an apparatus for obtaining a depth image which may increase a maximum measurement distance and improve a precision of the depth image.

Example embodiments may also provide a method of obtaining a depth image which may increase a maximum measurement distance without reducing a precision of the depth image.

Example embodiments may provide an apparatus for obtaining a depth image, the apparatus including a first ray emission unit to emit a first emission ray a second ray emission unit to emit a second emission ray a receiving unit to receive a first reflection ray associated with the first emission ray and a second reflection ray associated with the second emission ray and a processing unit to calculate a depth value corresponding to a first pixel, based on a charge provided from the first pixel of the receiving unit.

The first ray emission unit and the second ray emission unit may include infrared light-emitting diodes (LEDs).

The receiving unit may include a plurality of pixels which emit charges in proportion to an amount of light within a received ray.

According to example embodiments, a pulse width of the first emission ray may be different from a pulse width of the second emission ray.

The first ray emission unit and the second ray emission unit may be symmetrically arranged based on the receiving unit.

The apparatus for obtaining a depth image may further include a control unit to control at least one of the first ray emission unit, the second ray emission unit, and the receiving unit.

The control unit may provide a first control signal which is in-phase with the first emission ray in a first mode of operation of the receiving unit, and a second control signal having a first phase difference with the first emission ray in a second mode of operation of the receiving unit.

The first phase difference may be 180 degrees.

The processing unit may calculate a first Time of Flight (TOF) value based on the first charge and the second charge, calculate the depth value corresponding to the first pixel based on the first TOF value when the first TOF value is equal to or less than the pulse width of the first emission ray and the pulse width of the second emission ray, and calculate a second TOF value based on the first charge and the second charge, and the depth value corresponding to the first pixel based on the second TOF value, when the first TOF value is greater than any one of the pulse width of the first emission ray and the pulse width of the second emission ray.

The depth value corresponding to the first pixel of the receiving unit may be calculated using a formula relating the first TOF value or the second TOF value, and c, the speed of light constant.

According to example embodiments, there may be provided a method of obtaining a depth image, the method including emitting a first emission ray and a second emission ray, measuring charges respectively generated by a reflection ray of the first emission ray and a reflection ray of the second emission ray.

In this instance, a pulse width of the first emission ray may be different from a pulse width of the second emission ray.

The measuring may include measuring a first charge based on a first control signal which is in-phase with the first emission ray and measuring a second charge based on a second control signal having a first phase difference with the first emission ray.

The second control signal may have a phase difference of 180 degrees with the first control signal.

Additional aspects, features, and/or advantages of embodiments will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
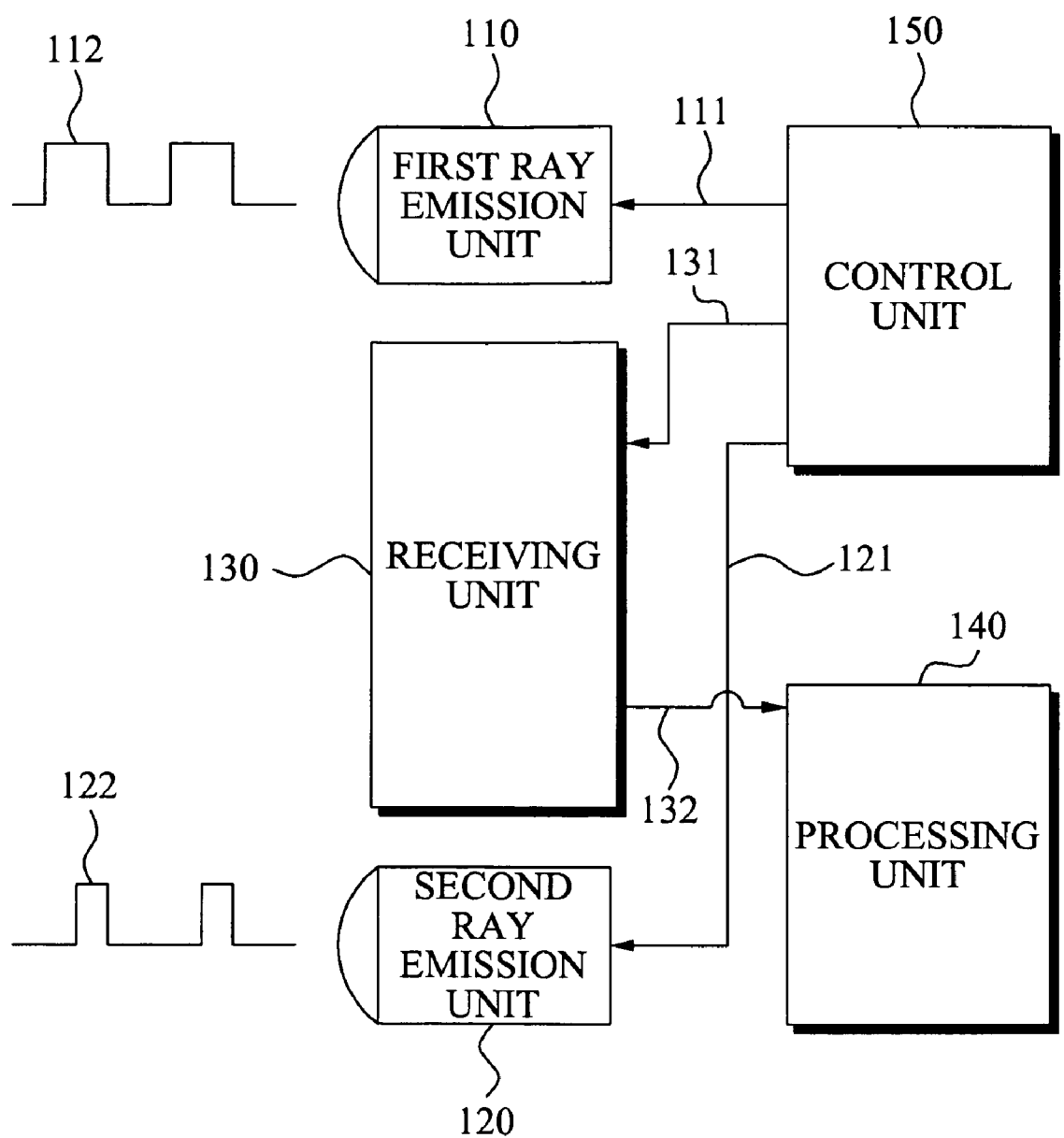
FIG. 1 illustrates a diagram of an apparatus for obtaining a depth image according to example embodiments.

Reference will now be made in detail to example embodiments which are illustrated in the accompanying drawings, wherein like reference numerals refer to the like elements throughout. Example embodiments are described below to explain the disclosure by referring to the figures.

FIG. 1 illustrates a diagram of an apparatus for obtaining a depth image according to example embodiments.

A first ray emission unit 110 emits a first emission ray 112 with a first pulse width. A second emission unit 120 may emit a second emission ray 122 with a second pulse width. According to example embodiments, the first pulse width may be different from the second pulse width. The first ray emission unit 110 and the second emission unit 120 may be an infrared light-emitting diode (LED).

The receiving unit 130 may receive a first reflection ray associated with the first emission ray 112 and a second reflection ray associated with the second emission ray 122. The first and second reflection rays are not illustrated in FIG. 1. According to example embodiments, the receiving unit 130 includes a plurality of pixels. Each of the plurality of pixels may generate an electric charge in proportion to a span and/or an amount of light when ray is received.

A processing unit 140 may calculate a depth value corresponding to each of the plurality of pixels, based on the electric charge 132 provided from each of the plurality of pixels.

A control unit 150 may provide a control signal 111 to the first ray emission unit 110. The control signal 111 may control the first pulse width and/or phase of the first emission ray. Also, the control unit 150 may provide a control signal 121 to the second ray emission unit 120. The control signal 121 may control the second pulse width and/or phase of the second emission ray. Also, the control unit 150 may provide a control signal 131 to the receiving unit 130. The receiving unit 130 may be operated by the control signal 131. According to example embodiments, when the control signal 131 is at a high level, the receiving unit 130 may receive a ray and generate an electric charge. Accordingly, the control signal 131 may function as an electronic shutter.

Figure 2:
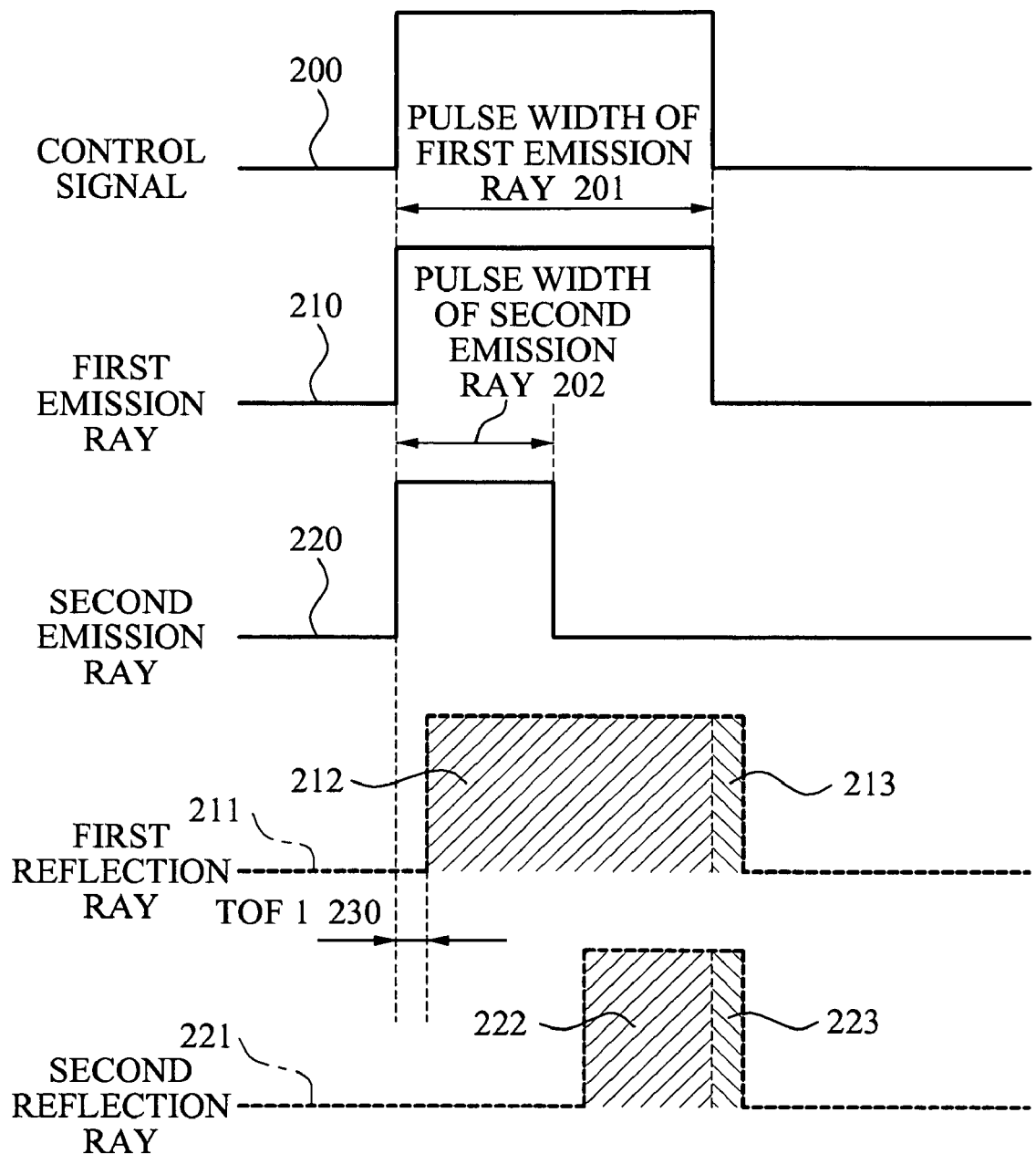
FIG. 2 illustrates an emission ray and a reflection ray in a first Time of Flight (TOF) according to example embodiments.

FIG. 2 illustrates an emission ray and reflection ray in a first Time of Flight (TOF) according to example embodiments.

A pulse width 201 of a first emission ray 210 emitted from a first ray emission unit 110 (FIG. 1) may be greater than a pulse width 202 of a second emission ray 220 emitted from a second ray emission unit 120 (FIG. 1). A control signal 200 may be in-phase with the first emission ray 210, and may have a pulse width identical to the first emission ray 210. When the control signal 200 is a high level, a receiving unit 130 (FIG. 1) may receive a first reflection ray 211 associated with the first emission ray 210 and a second reflection ray 221 associated with the second emission ray 220.

The receiving unit 130 (FIG. 1) may generate an electric charge in proportion to an amount of the received ray.

The first reflection ray 211, received by the receiving unit 130 (FIG. 1), may have a first TOF (TOF 1) 230 which has a phase difference with the first emission ray 210. Accordingly, while the receiving unit 130 (FIG. 1) is operated by the control signal 200, the electric charge, generated by the receiving unit 130 (FIG. 1) after receiving the first reflection ray 211, may be in proportion to a width of an area 212, the area 212 being shown as an upward sloping diagonal hatch. Also, an electric charge in proportion to a width of an area 213, the area 213 being shown as a downward sloping diagonal hatch, may not be sensed by the receiving unit 130 (FIG. 1), while the receiving unit 130 (FIG. 1) is operated by the control signal 200.

The second reflection ray 221, received by the receiving unit 130 (FIG. 1), may have the first TOF 230 which has a phase difference with the second emission ray 220. Accordingly, while the receiving unit 130 (FIG. 1) is operated by the control signal 200, the electric charge, generated by the receiving unit 130 (FIG. 1) after receiving the second reflection ray 221, may be in proportion to a width of an area 222, the area 222 being shown as an upward sloping diagonal hatch. Also, an electric charge in proportion to a width of an area 223, shown as a downward sloping diagonal hatch, may not be sensed by the receiving unit 130 (FIG. 1), while the receiving unit 130 (FIG. 1) is operated by the control signal 200.

Figure 3:
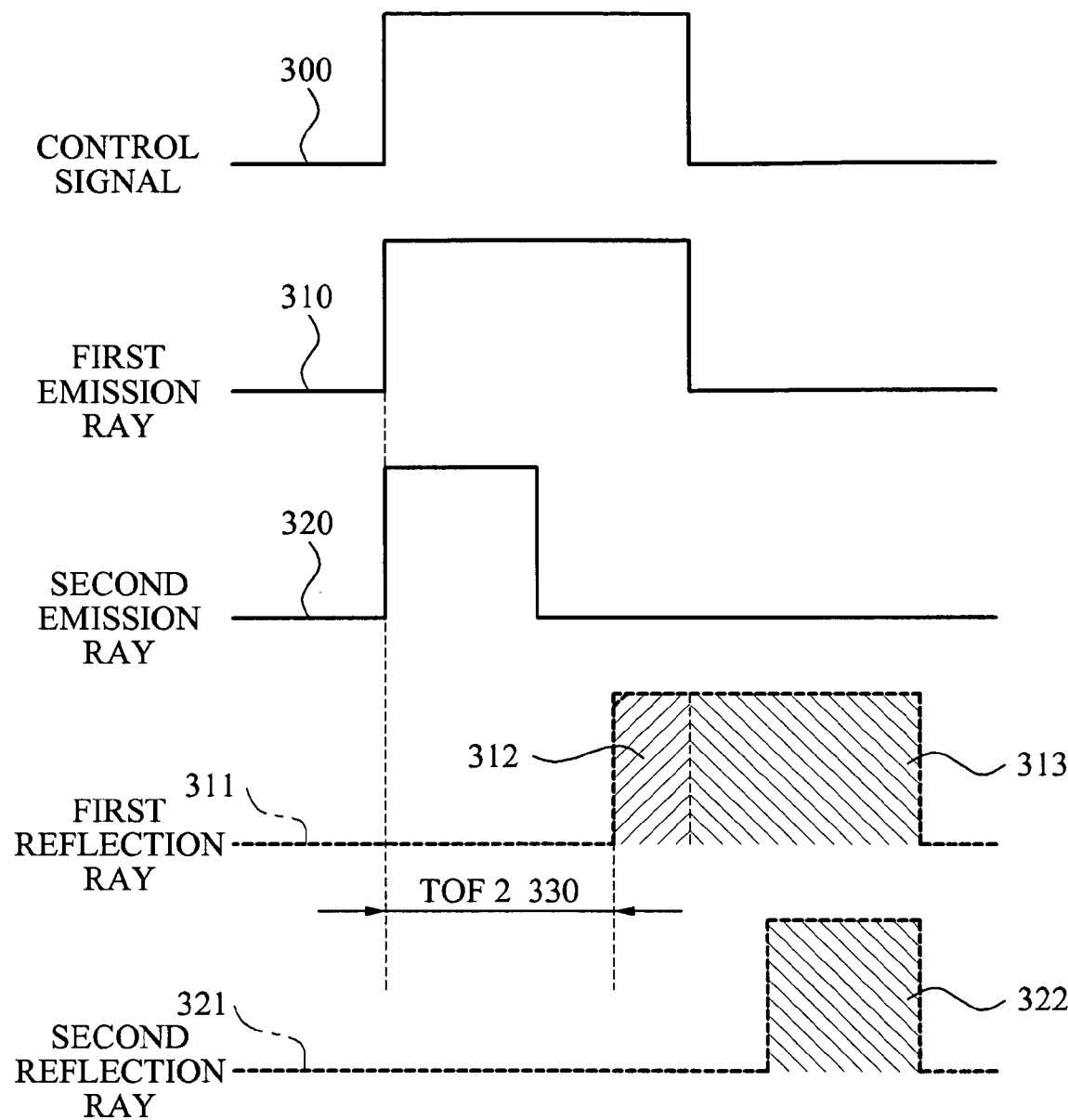
FIG. 3 illustrates an emission ray and a reflection ray in a second TOF according to example embodiments.

FIG. 3 illustrates an emission ray and reflection ray in a second TOF according to example embodiments.

A first emission ray 310 may correspond to the first emission ray 210 of FIG. 2, and may have the same pulse width with the first emission ray 210. A second emission ray 320 may correspond to the second emission ray 220 of FIG. 2, and may have the same pulse width with the second emission ray 220. A control signal 300 may correspond to the control signal 200 (FIG. 2).

A first reflection ray 311, received by the receiving unit 130 (FIG. 1), may have a second TOF (TOF 2) 330 which may have a phase difference with the first emission ray 310. Accordingly, while the receiving unit 130 (FIG. 1) is operated by the control signal 300, the electric charge, generated by the receiving unit 130 (FIG. 1) after receiving the first reflection ray 311, may be in proportion to a width of an area 312, where the area 312 is shown as an upward sloping diagonal hatch. Also, an electric charge in proportion to a width of an area 313, shown as a downward sloping diagonal hatch, may not be sensed by the receiving unit 130 (FIG. 1), while the receiving unit 130 (FIG. 1) is operated by the control signal 300.

However, the second TOF 330 may be greater than the pulse width of the second emission ray 320. Accordingly, an electric charge which is proportion to a width of an area 322, shown as a downward sloping diagonal hatch of a second reflection ray 321, may not be sensed by the receiving unit 130 (FIG. 1) while the receiving unit 130 (FIG. 1) is operated by the control signal 300, while the first reflection ray 311 being sensed by the receiving unit.

Figure 4:
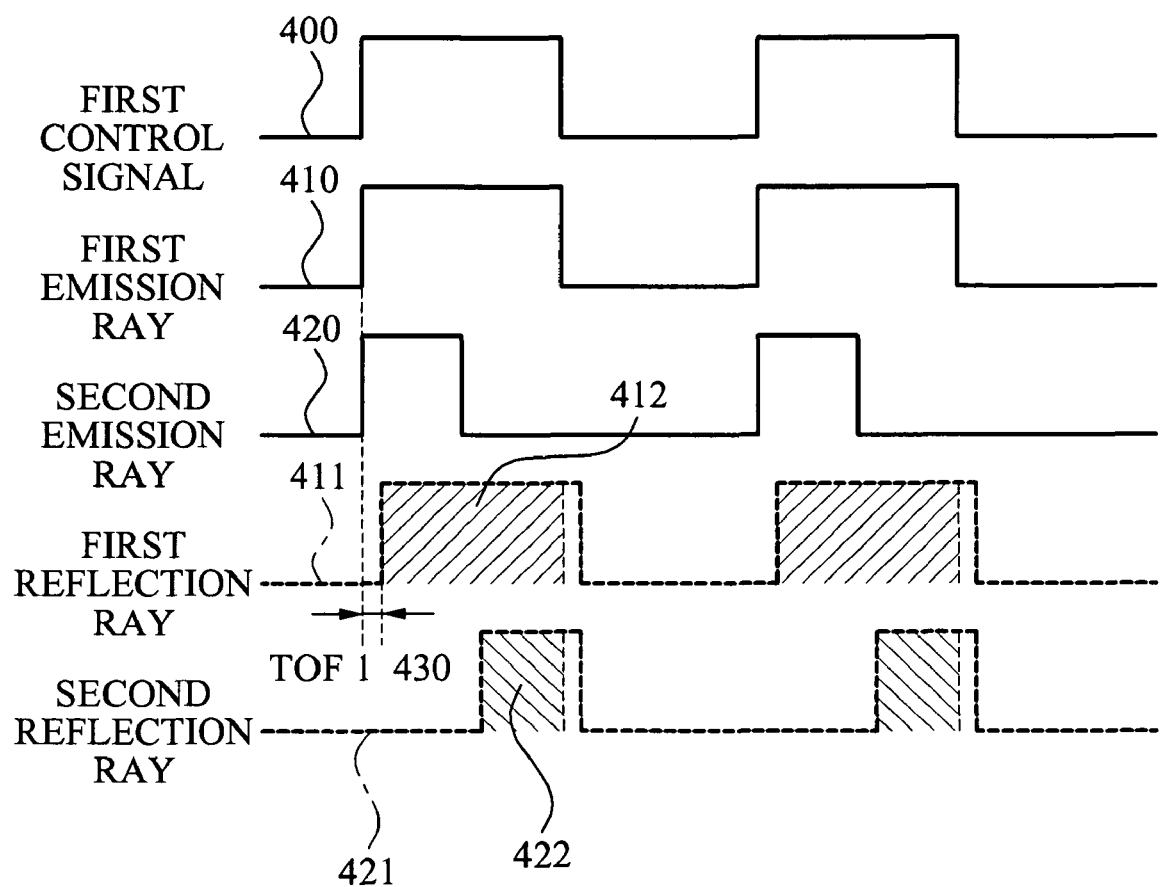
FIG. 4 illustrates measurement of a reflection ray associated with a first control signal in a first TOF according to example embodiments.

FIG. 4 illustrates measurement of a reflection ray associated with a first control signal in a first TOF according to example embodiments.

According to example embodiments, a first emission ray 410 has a pulse width twice as wide as a second emission ray 420. A first control signal 400, provided by the control unit 150 (FIG. 1) in a first mode, may have a pulse width identical to the first emission ray 410. Also, the first control signal 400 may be in-phase with the first emission ray 410. A first TOF (TOF 1) 430 may be smaller than a pulse width of the second emission ray 420. An electric charge generated from the receiving unit 130 (FIG. 1), operated by the first control signal 400, may be calculated, for example by the following Equation 1, Equation 2, and Equation 3.

$$Q_A = a*(2TOT - TOF) \quad \text{Equation 1}$$

Here, TOF≦TOT, and $Q_A$ may denote an electric charge generated by the receiving unit 130 (FIG. 1) after receiving a first reflection ray 411 while the receiving unit 130 is operated by the first control signal 400. $Q_A$ may be in proportion to a width of an area 412, where the area 412 is shown as an upward sloping diagonal hatch. Also, "a" may denote a proportional constant according to example embodiments. It may be assumed that amplitudes of the first and second emission rays are identical. The proportional constant may include a reflection rate, quantum efficiency, etc. TOT denotes the pulse width of the second emission ray 420, and 2TOT denotes the pulse width of the first emission ray 410.

$$Q_B = a*(TOT - TOF) \quad \text{Equation 2}$$

Here, TOF≦TOT, and $Q_B$ may denote an electric charge generated by the receiving unit 130 (FIG. 1) after receiving a second reflection ray 421 while the receiving unit 130 (FIG. 1) is operated by the first control signal 400. $Q_B$ may be in proportion to a width of an area 422, where the area 422 is shown as a downward sloping diagonal hatch. Also, "a" may denote a proportional constant according to example embodiments.

$$Q_1 = Q_A + Q_B \quad \text{Equation 3}$$
$$= a*(3TOT - 2TOF)$$

Here, TOF≦TOT, and $Q_1$ may denote an electric charge generated by the receiving unit 130 (FIG. 1) while the receiving unit 130 (FIG. 1) is operated by the first control signal 400. $Q_1$ may be in proportion to a sum of widths of the area 412 and the area 422.

Figure 5:
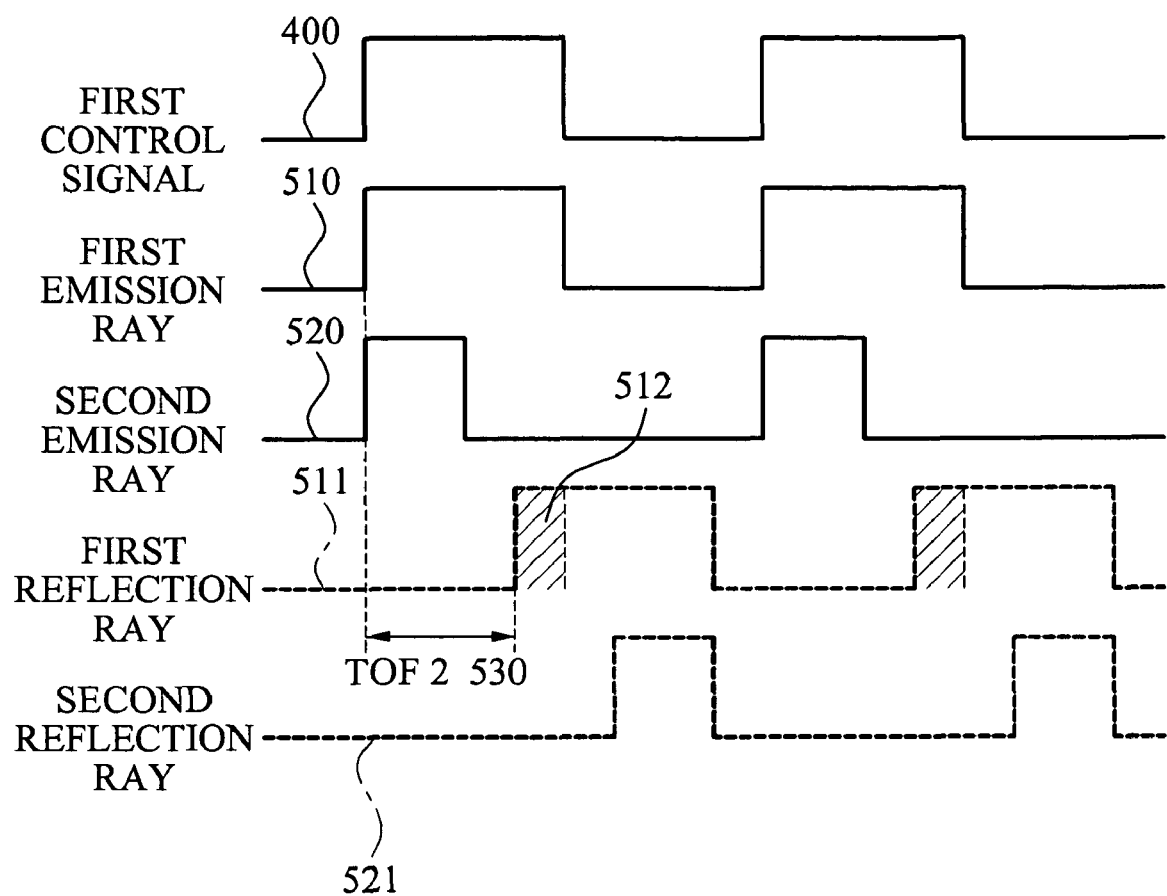
FIG. 5 illustrates measurement of a reflection ray associated with a first control signal in a second TOF according to example embodiments.

FIG. 5 illustrates measurement of a reflection ray associated with a first control signal in a second TOF according to example embodiments.

A first emission ray 510 may correspond to the first emission ray 410 of FIG. 4, and may have a pulse width twice as wide as a second emission ray 520. The first control signal 400 may have a pulse width identical to the first emission ray 510, and may be in-phase with the first emission ray 510. According to example embodiments, a second TOF (TOF 2) 530 may be greater than a pulse width of a second emission ray 520. An electric charge generated by the receiving unit 130 (FIG. 1) while the receiving unit 130 (FIG. 1) is operated by the first control signal 400 may be calculated, for example, by the following Equation 4, Equation 5, and Equation 6.

$$Q_A = a*(2TOT - TOF) \quad \text{Equation 4}$$

Here, TOF>TOT, and $Q_A$ may denote an electric charge generated by the receiving unit 130 (FIG. 1) after receiving a first reflection ray 511 while the receiving unit 130 (FIG. 1) is operated by the first control signal 400. $Q_A$ may be in proportion to a width of an area 512, the width of an area 512 being shown by an upward sloping diagonal hatch. Also, "a" may denote a proportional constant according to example embodiments. TOT may denote a pulse width of the second emission ray 520 and 2TOT may denote a pulse width of the first emission ray 510.

$$Q_B = 0 \quad \text{Equation 5}$$

Here, TOF>TOT. A second reflection ray 521 may not be detected from the receiving unit 130 (FIG. 1) while the receiving unit 130 (FIG. 1) is operated by the first control signal 400. Accordingly, in Equation 5, a value of $Q_B$ is 0.

$$Q_1 = Q_A + Q_B \quad \text{Equation 6}$$
$$= a*(2TOT - TOF)$$

Here, TOF>TOT, and $Q_1$ may denote an electric charge generated by the receiving unit 130 (FIG. 1) while the receiving unit 130 (FIG. 1) is operated by the first control signal 400. $Q_1$ may be equal to $Q_A$ of FIG. 4. As described above, the second reflection ray 521 may not be detected from the receiving unit 130 (FIG. 1) in a TOF greater than the pulse width of the second emission ray 520, while the receiving unit 130 (FIG. 1) is operated by the first control signal 400.

Figure 6:
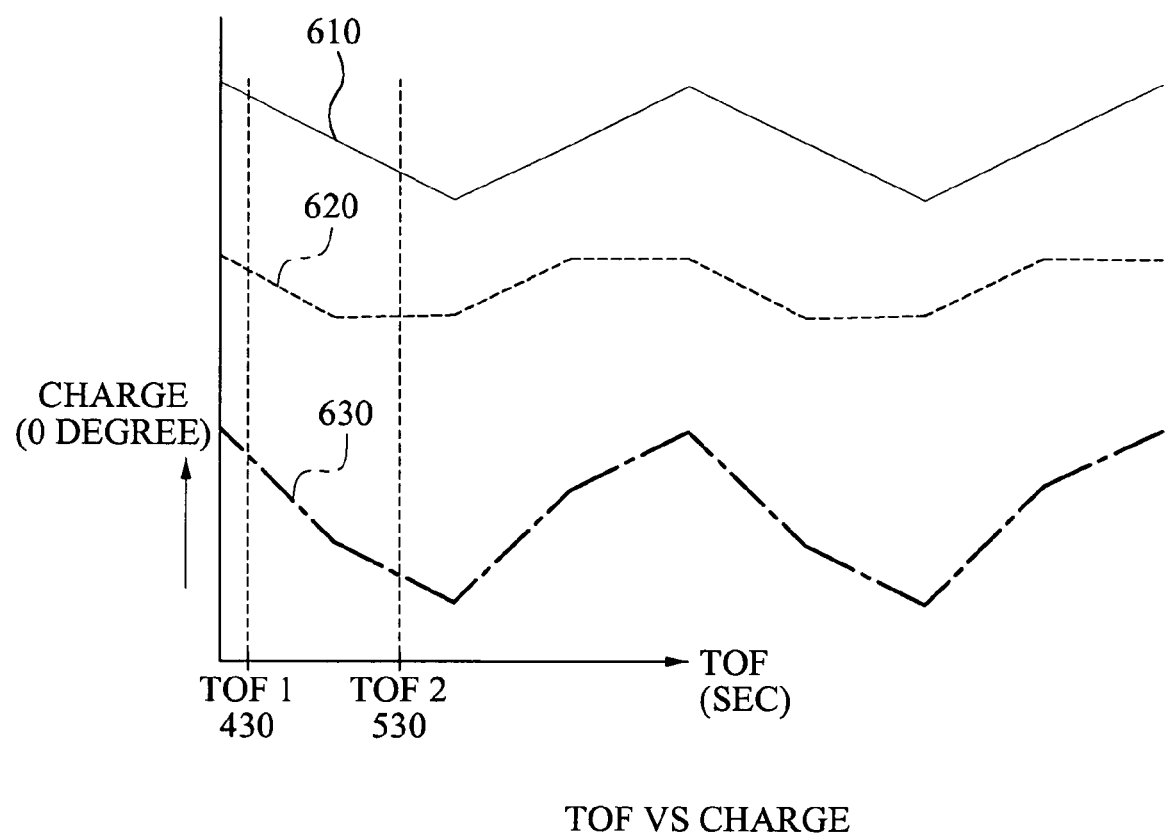
FIG. 6 illustrates a graph plotting a change of a first charge with respect to a TOF according to example embodiments.

FIG. 6 illustrates a graph plotting a change of a first electric charge with respect to a TOF according to example embodiments.

An x axis may correspond to a TOF value, and y axis may correspond to an electric charge detected from the receiving unit 130 (FIG. 1) while the receiving unit 130 (FIG. 1) is operated by the first control signal 400 (FIG. 5). A graph 610 may correspond to a change of $Q_A$ value, a graph 620 may indicate a change of a $Q_B$ value, and a graph 630 may indicate a change of a $Q_1$ value which is the first electric charge.

In general, in an indirect method, a reflection ray associated with a second control signal, different from the first control signal, may be measured to obtain a depth image regardless of a reflectivity of an object. The measured reflection ray may be represented as a proportional constant "a".

Figure 7:
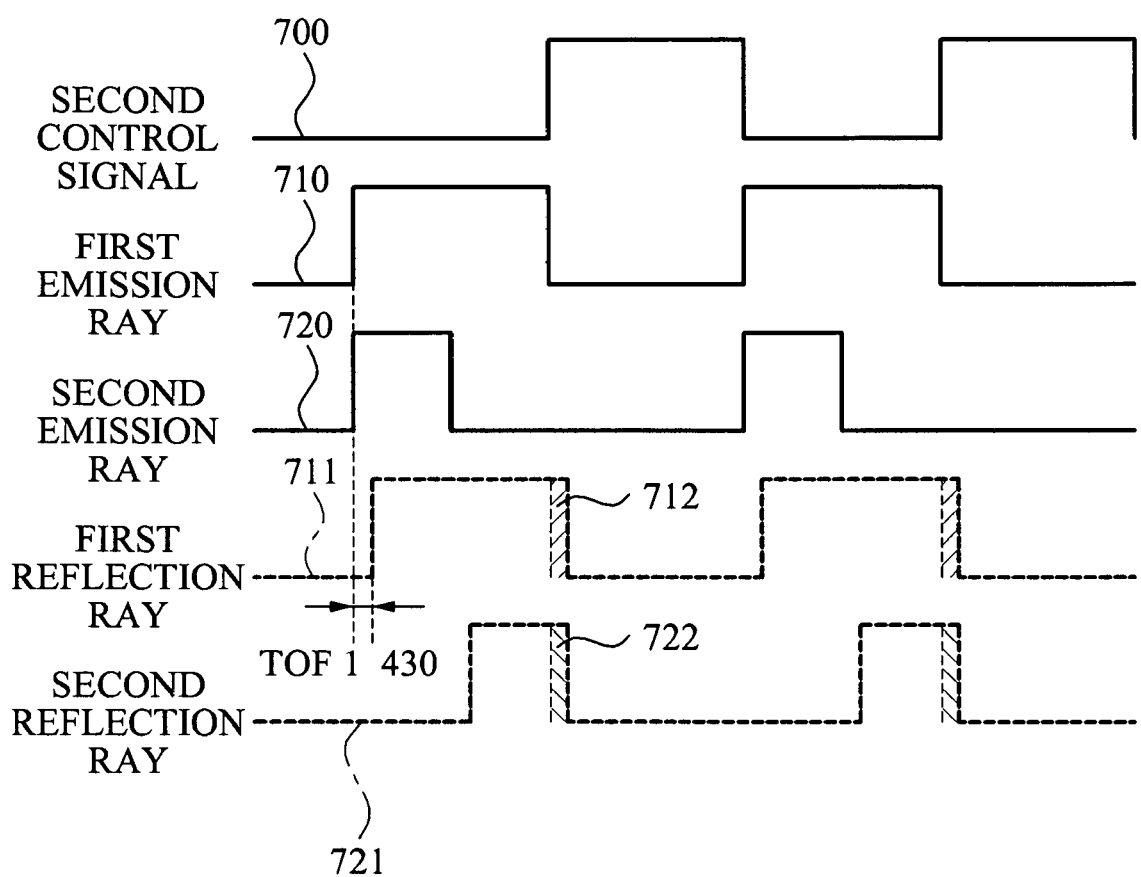
FIG. 7 illustrates measurement of a reflection ray associated with a second control signal in a first TOF according to example embodiments.

FIG. 7 illustrates measurement of a reflection ray associated with a second control signal in a first TOF according to example embodiments.

According to example embodiments, a first emission ray 710 may correspond to the first emission ray 410 of FIG. 4, and may have a pulse width twice as wide as a second emission ray 720. Also, a second control signal 700 provided by the control unit 150 (FIG. 1) in a second mode may have a pulse width identical to the first emission ray 710. The second control signal 700 also may have a phase difference with the first emission ray 710 of 180 degrees. A first TOF (TOF 1) 430 may be smaller than a pulse width of the second emission ray 720. An electric charge generated by the receiving unit 130 (FIG. 1), operated by the second control signal 700, may be calculated, for example, by the below Equation 7, Equation 8, and Equation 9.

$$Q_A = a*TOF \quad \text{Equation 7}$$

Here, TOF≦TOT, and $Q_A$ may denote an electric charge generated by the receiving unit 130 (FIG. 1) after receiving a first reflection ray 711 while the receiving unit 130 (FIG. 1) is operated by the second control signal 700. $Q_A$ may be in proportion to a width of an area 712, the area 712 being shown as an upward diagonal sloped hatch. Also, "a" may denote a proportional constant according to example embodiments. TOT may denote a pulse width of the second emission ray 720.

$$Q_B = a*TOF \qquad \text{Equation 8}$$

Here, TOF≦TOT, and $Q_B$ may denote an electric charge generated by the receiving unit 130 (FIG. 1) after receiving a second reflection ray 721 while the receiving unit 130 (FIG. 1) is operated by the second control signal 700. $Q_B$ may be in proportion to a width of an area 722, the area 722 being shown as a downward diagonal sloped hatch. Also, "a" may denote a proportional constant according to example embodiments.

$$Q_2 = Q_A + Q_B \qquad \text{Equation 9}$$
$$= a*2TOF$$

Here, TOF≦TOT, and $Q_2$ may denote an electric charge generated by the receiving unit 130 (FIG. 1) while the receiving unit 130 (FIG. 1) is operated by the second control signal 700. $Q_2$ may be in proportion to a sum of widths of the area 712 and the area 722.

Figure 8:
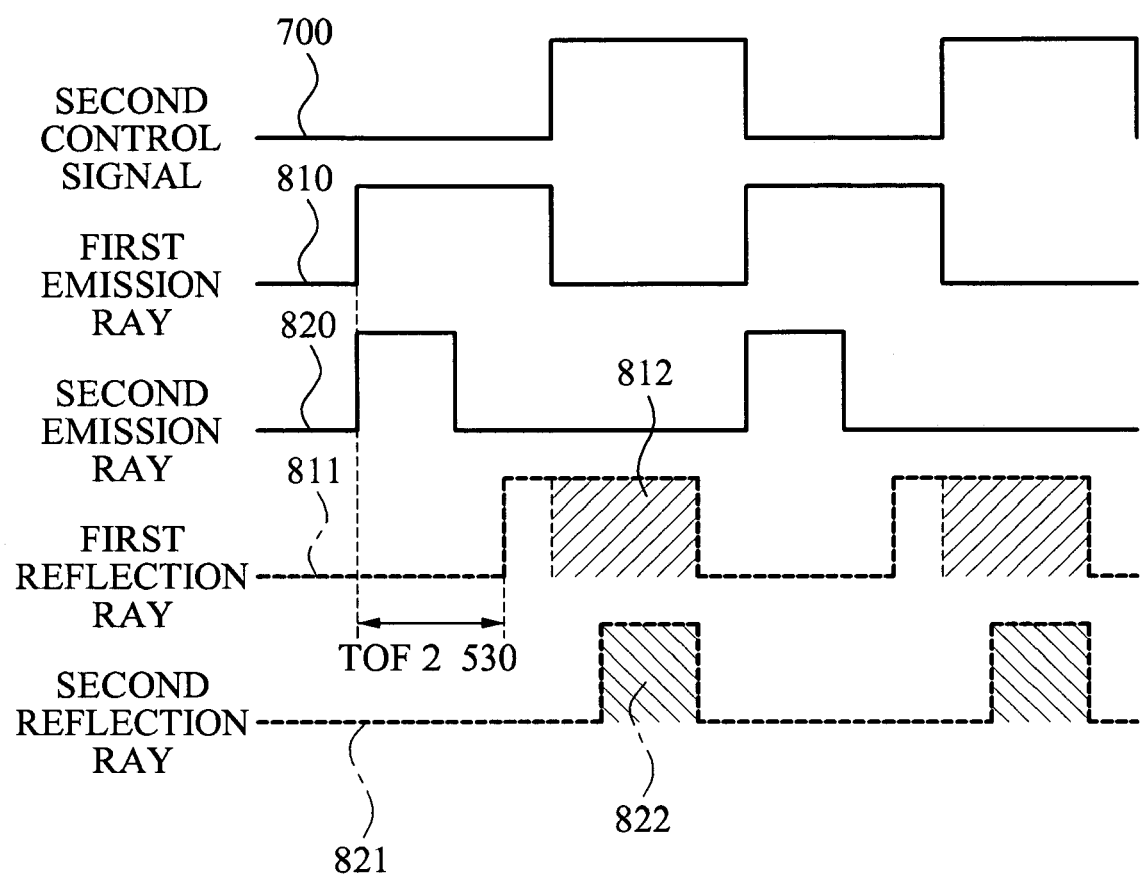
FIG. 8 illustrates measurement of a reflection ray associated with a second control signal in a second TOF according to example embodiments.

FIG. 8 illustrates measurement of a reflection ray associated with a second control signal in a second TOF according to example embodiments.

A first emission ray 810 may correspond to the first emission ray 710 of FIG. 7, and may have a pulse width twice as wide as a second emission ray 820. Also, the second control signal 700 may have a pulse width identical to the first emission ray 810, and may have a phase difference with the first emission ray 810 of 180 degrees. According to example embodiments, a second TOF (TOF 2) 530 may be smaller than a pulse width of the second emission ray 820. An electric charge, generated by the receiving unit 130 (FIG. 1) while operated by the second control signal 700, may be calculated, for example, by the below Equation 10, Equation 11, and Equation 12.

$$Q_A = a*TOF \qquad \text{Equation 10}$$

Here, TOF>TOT, and $Q_A$ may denote an electric charge generated by the receiving unit 130 (FIG. 1) after receiving a first reflection ray 811 while the receiving unit 130 (FIG. 1) is operated by the second control signal 700. $Q_A$ may be in proportion to a width of an area 812, the area 812 being shown as an upward sloping diagonal hatch. Also, "a" may denote a proportional constant according to example embodiments. TOT may denote a pulse width of the second emission ray 820.

$$Q_B = a*TOT \qquad \text{Equation 11}$$

Here, TOF>TOT, and $Q_B$ may denote an electric charge generated by the receiving unit 130 (FIG. 1) after receiving a second reflection ray 821 while the receiving unit 130 (FIG. 1) is operated by the second control signal 700. $Q_B$ may be in proportion to a width of an area 822, the area 822 being shown as a downward sloping diagonal hatch. Also, "a" may denote a proportional constant according to example embodiments. A value of $Q_B$ may not be 0, as opposed to Equation 5.

$$Q_2 = Q_A + Q_B \qquad \text{Equation 12}$$
$$= a*TOF + aTOT$$

Here, TOF>TOT, and $Q_2$ may denote an electric charge generated by the receiving unit 130 (FIG. 1) while the receiving unit 130 (FIG. 1) is operated by the second control signal 700. $Q_2$ may be in proportion to a sum of widths of the area 812 and the area 822.

Figure 9:
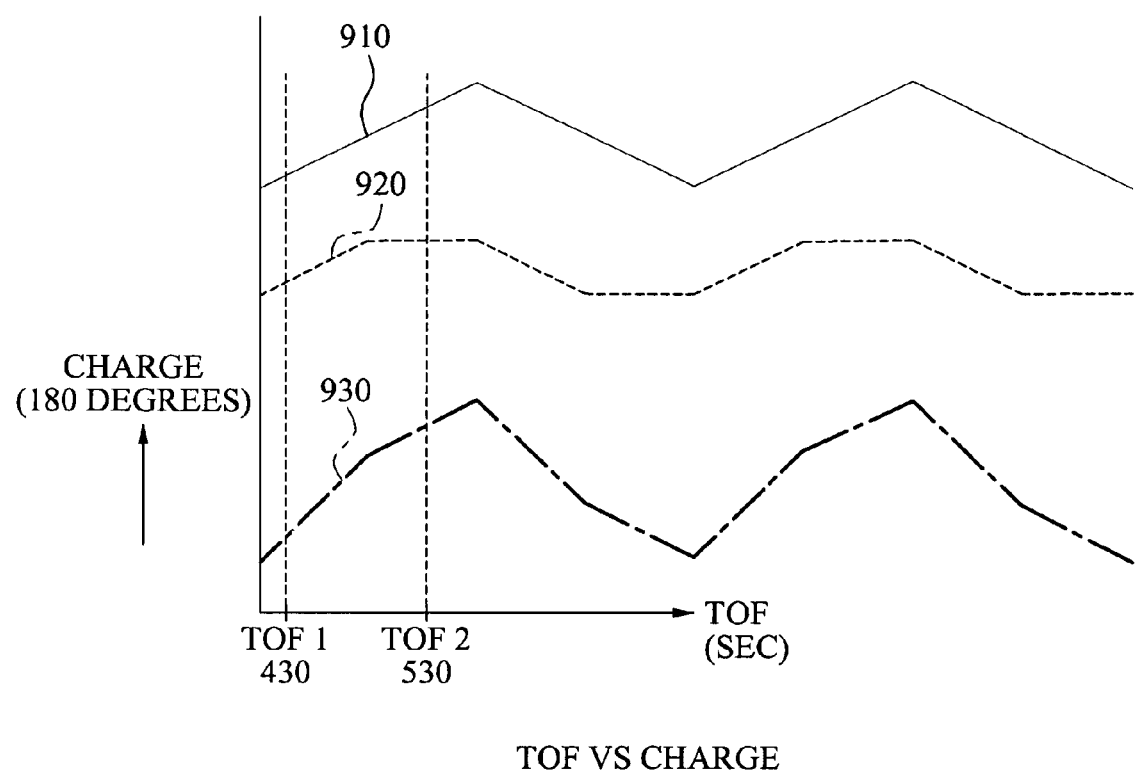
FIG. 9 illustrates a graph plotting a change of a second charge with respect to a TOF according to example embodiments.

FIG. 9 illustrates a graph plotting a change of a second electric charge with respect to a TOF according to example embodiments.

An x axis may correspond to a TOF value, and y axis may correspond to an electric charge detected from the receiving unit 130 while the receiving unit 130 is operated by the second control signal 700. A graph 910 may correspond to a change of a $Q_A$ value, a graph 920 may indicate a change of a $Q_B$ value, and a graph 930 may indicate a change of a $Q_2$ value which may be a second electric charge.

According to example embodiments, when combining Equation 3 and Equation 9, and TOF≦TOT, a relationship among a first electric charge $Q_1$, a second electric charge $Q_2$, and TOF may be given by the below Equation 13, for example.

$$TOF = 1.5*TOT*Q_2/(Q_1+Q_2) \qquad \text{Equation 13}$$

where TOF≦TOT.

According to other example embodiments, when combining Equation 6 and Equation 12, and TOF>TOT, a relationship among the first electric charge $Q_1$, second electric charge $Q_2$, and TOF may be given by the below Equation 14, for example.

$$TOF = TOT*(2Q_2-Q_1)/(Q_1+Q_2) \qquad \text{Equation 14}$$

Here, TOF>TOT. Also, a depth value, Depth, may be given by the below Equation 15, for example.

$$Depth = c*TOF/2 \qquad \text{Equation 15}$$

Here, "c" denotes a speed of light.

According to still other example embodiments, the first emission ray, second emission ray, and control signal respectively illustrated in FIG. 4 through FIG. 9 may have different waveforms such as a sine wave or chopping wave. Also, a pulse width of the first emission ray and second emission ray may be different. However, the above-described Equations may be changed depending upon embodiments, which is obvious to those skilled in the related art.

Also, although it is respectively illustrated that the first control signal is in-phase with the first emission ray and the second control signal may have a phase difference with the first emission ray of 180 degrees in FIG. 4 through FIG. 9, the example embodiments are not limited thereby. For example, the first control signal may be in-phase with the first emission ray, and the second control signal may be controlled to have a phase difference of 90 degrees with the first emission ray. In this instance, above-described Equations may be changed by those skilled in the related art.

Figure 10:
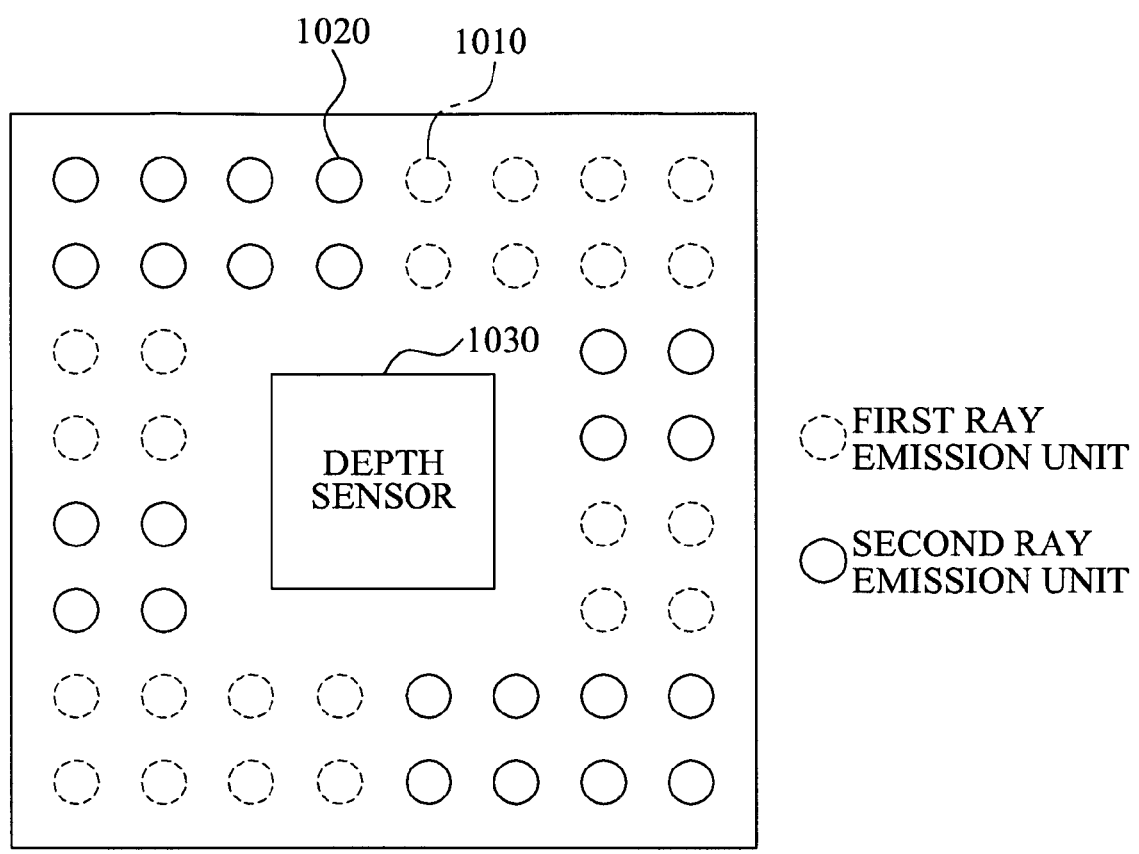
FIG. 10 illustrates a diagram of first and second ray emission units and a receiving unit of an apparatus for obtaining a depth image according to example embodiments.

FIG. 10 illustrates a diagram of a first ray emission unit 1010, shown as dashed line circles, a second ray emission unit 1020, shown as solid line circles, and a receiving unit 1030 of an apparatus for obtaining a depth image according to example embodiments.

Each element of the first ray emission unit 1010 and the second ray emission unit 1020 may be an infrared LED. Since an amplitude of a ray provided by a single LED is limited, a plurality of LEDs may be used as illustrated in FIG. 10. In this case, LEDs of the first ray emission unit 1010 and the second ray emission unit 1020 may be symmetrically arranged around a receiving unit 1030. In FIG. 10, a depth sensor may be the receiving unit 1030.

A pulse width of the ray emitted from the first ray emission unit 1010 and the second ray emission unit 1020 may be controlled. Also, an amplitude of emitted ray may be changed by changing a number of the plurality of LEDs. In this instance, above-described Equations may be changed by those skilled in the related art.

According to other example embodiments, a third ray emission unit, not illustrated, as well as the first ray emission unit 1010 and the second ray emission unit 1020 may be used, and thus a ray emission unit having at least three pulse widths different from each other may be used. In this instance, an electric charge generated by the receiving unit 1030, TOF, and depth value may be obtained by changing the above-described Equations.

Figure 11:
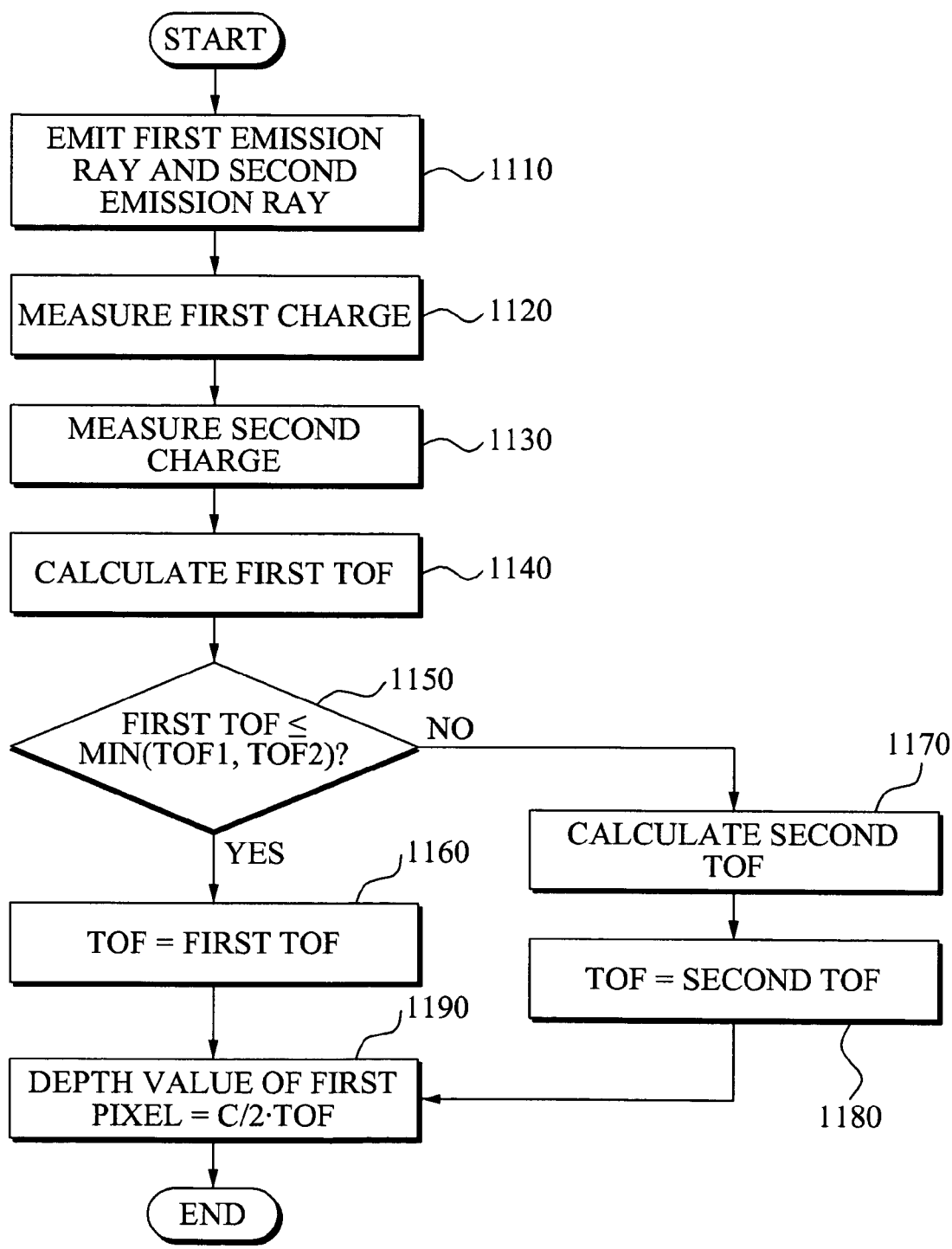
FIG. 11 illustrates a flowchart of a method of obtaining a depth image according to example embodiments.

FIG. 11 illustrates a flowchart of a method of obtaining a depth image according to example embodiments.

In operation S1110, first and second emission rays may be emitted. According to example embodiments, the first and second emission rays may be square waves. The first emission ray may have a pulse width twice as wide as the second emission ray.

However, a waveform and pulse width of the first and second emission rays may be changed depending upon embodiments.

In operation S1120, a first electric charge $Q_1$, generated by a first pixel of a receiving unit 130 (FIG. 1) while the receiving unit 130 (FIG. 1) is operated by a first control signal, may be measured. The first control signal may have a pulse width identical to the first emission ray, and is in-phase with the first emission ray.

In operation S1130, a second electric charge $Q_2$, generated by the first pixel of the receiving unit 130 (FIG. 1) while the receiving unit 130 (FIG. 1) is operated by a second control signal, may be measured. The second control signal has a phase difference of 180 degrees with the first control signal. The phase difference may be changed depending on embodiments. Also, the first electric charge $Q_1$ and/or the second electric charge $Q_2$ may be measured by a processing unit. According to other example embodiments, the first electric charge $Q_1$ and/or the second electric charge $Q_2$ may be measured in the first pixel of the receiving unit and provided to the processing unit.

In operation S1140, a first TOF (TOF 1) may be calculated by Equation 13 with an assumption that TOF≦TOT Accordingly, the first TOF is $1.5*TOT*Q_2/(Q_1+Q_2)$. Here, TOT may denote a pulse width of the second emission ray.

In operation S1150, whether the assumption is appropriate may be determined. That is, whether the first TOF calculated in operation S1140 is smaller than the pulse width of the first and second emission rays may be determined.

In operation S1160, when a result of determination in operation S1150 is positive, a final TOF value may be determined as the first TOF.

Also, a depth value of the first pixel may be determined using Equation 15 in operation S1190.

However, when the result of determination in operation S1150 is negative, the assumption may be inappropriate. Accordingly, TOF is greater than TOT. That is, in operation S1170, a second TOF may be calculated by Equation 14. Thus, the second TOF may be $TOT*(2Q_2-Q_1)/(Q_1+Q_2)$.

In operation S1180, a final TOF value may be determined as the second TOF.

In operation S1190, a depth value of the first pixel may be calculated. When the above-described operations are repeated with respect to a plurality of pixels of the receiving unit, a depth image including the plurality of pixels may be obtained.

The method of obtaining a depth image according to the above-described example embodiments may be recorded in computer-readable media including program instructions to implement various operations embodied by a computer. The media may also include, alone or in combination with the program instructions, data files, data structures, etc. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, etc. Examples of program instructions include both machine code, such as produced by a compiler, and files containing higher level code that may be executed by the computer using an interpreter. The described hardware devices may be configured to act as one or more software modules in order to perform the operations of the above-described example embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for obtaining a depth image, the apparatus comprising:
    a first ray emission unit to emit a first emission ray having a first pulse width;
    a second ray emission unit to emit a second emission ray having a second pulse width;
    a receiving unit to receive a first reflection ray associated with the first emission ray and to receive a second reflection ray associated with the second emission ray; and
    a processing unit to calculate a time of flight (TOF) value, and to calculate a depth value corresponding to a first pixel of the receiving unit,
    wherein the depth value is based on a charge provided from the first pixel of the receiving unit and a comparison of the TOF value to at least one of the first pulse width and the second pulse width.

2. The apparatus of claim 1, wherein the first ray emission unit and the second ray emission unit comprise infrared light-emitting diodes (LED).

3. The apparatus of claim 1, wherein the receiving unit comprises a plurality of pixels which generate charges in proportion to an amount of light within a received ray.

4. The apparatus of claim 1, wherein the first pulse width of the first emission ray is different from the second pulse width of the second emission ray.

5. The apparatus of claim 1, wherein the first ray emission unit and the second ray emission unit are symmetrically arranged based on the receiving unit.

6. The apparatus of claim 1, further comprising:
    a control unit to control at least one of the first ray emission unit, the second ray emission unit, and the receiving unit.

7. The apparatus of claim 6, wherein the control unit provides a first control signal which is in-phase with the first emission ray in a first mode of operation of the receiving unit, and provides a second control signal having a first phase difference with the first emission ray in a second mode of operation of the receiving unit.

8. The apparatus of claim 7, wherein the first phase difference is 180 degrees.

9. The apparatus of claim 7, wherein the processing unit calculates the depth value corresponding to the first pixel based on a first charge and a second charge, the first charge being provided from the first pixel of the receiving unit in the first mode, the second charge being provided from the first pixel of the receiving unit in the second mode.

10. The apparatus of claim 9, wherein:
the processing unit calculates a first TOF value based on the first charge and the second charge, and calculates the depth value corresponding to the first pixel of the receiving unit based on the first TOF value if the first TOF value is equal to or less than the first pulse width of the first emission ray and the second pulse width of the second emission ray, and the processing unit calculates a second TOF value if the first TOF value is greater than any one of the first pulse width of the first emission ray and the second pulse width of the second emission ray, based on the first charge and the second charge, and calculates the depth value corresponding to the first pixel of the receiving unit based on the second TOF value.

11. The apparatus of claim 10, wherein the depth value corresponding to the first pixel of the receiving unit=c*(TOF value)/2, the TOF value being either the first TOF value or the second TOF value, and c being the speed of light constant.

12. The apparatus of claim 1, wherein the second pulse width of the second emission ray is twice as wide as the first pulse width of the first emission ray.

13. A method of obtaining a depth image, the method comprising:
emitting a first emission ray having a first pulse width;
emitting a second emission ray having a second pulse width;
measuring charges respectively generated by a reflection ray of the first emission ray and a reflection ray of the second emission ray;
calculating a time of flight (TOF) value; and
calculating a depth value corresponding to a first pixel based on the measured charges and a comparison of the TOF value to at least one of the first pulse width and the second pulse width.

14. The method of claim 13, wherein the first pulse width of the first emission ray is different from the second pulse width of the second emission ray.

15. The method of claim 13, wherein the measuring comprises:
measuring a first charge based on a first control signal which is in-phase with the first emission ray; and
measuring a second charge based on a second control signal having a first phase difference with the first emission ray.

16. The method of claim 15, wherein the first phase difference is 180 degrees.

17. The method of claim 15, wherein the second control signal has a phase difference of 180 degrees with the first control signal.

18. The method of claim 15, wherein the calculated depth value of the first pixel is based on the first charge and the second charge.

19. The method of claim 18, wherein the calculating comprises:
calculating a first TOF value based on the first charge and the second charge;
calculating the depth value corresponding to the first pixel based on the first TOF value if the first TOF value is equal to or less than the first pulse width of the first emission ray and the second pulse width of the second emission ray;
calculating a second TOF value if the first TOF value is greater than any one of the first pulse width of the first emission ray and the second pulse width of the second emission ray, based on the first charge and the second charge; and
calculating the depth value corresponding to the first pixel based on the second TOF value.

20. A non-transitory computer-readable recording medium having stored thereon instructions for causing a computer to implement a method of obtaining a depth image, the instructions comprising:
emitting a first emission ray having a first pulse width;
emitting a second emission ray having a second pulse width;
measuring charges respectively generated by a reflection ray of the first emission ray and a reflection ray of the second emission ray;
calculating a time of flight (TOF) value; and
calculating a depth value corresponding to a first pixel based on the measured charges and a comparison of the TOF value to at least one of the first pulse width and the second pulse width.

21. The computer-readable recording medium of claim 20, wherein the first pulse width of the first emission ray is different from the second pulse width of the second emission ray.

22. The computer-readable recording medium of claim 20, wherein the measuring comprises:
measuring a first charge of the charges based on a first control signal which is in-phase with the first emission ray; and
measuring a second charge of the charges based on a second control signal having a first phase difference with the first emission ray.

23. The computer-readable recording medium of claim 22, wherein the calculated depth value of the first pixel is based on the first charge and the second charge.

24. The computer-readable recording medium of claim 23, wherein the depth value corresponding to a first pixel=$c*(1.5*TOT*Q_2/(Q_1+Q_2))/2$, when the first TOF value is equal to or less than the first pulse width of the first emission ray and the second pulse width of the second emission ray, and
the depth value corresponding to a first pixel=$c*(TOT*(2Q_2-Q_1)/(Q_1+Q_2))/2$, if the first TOF value is greater than any one of the first pulse width of the first emission ray and the second pulse width of the second emission ray,
c being the speed of light constant, TOT being the pulse width of the second emission ray, Q1 being the first charge, and Q2 being the second charge.

25. The computer-readable recording medium of claim 23, wherein the calculating comprises:
calculating a first TOF value based on the first charge and the second charge;
calculating the depth value corresponding to the first pixel based on the first TOF value if the first TOF value is equal to or less than the first pulse width of the first emission ray and the second pulse width of the second emission ray;
calculating a second TOF value based on the first charge and the second charge if the first TOF value is greater than any one of the first pulse width of the first emission ray and the second pulse width of the second emission ray; and
calculating the depth value corresponding to the first pixel based on the second TOF value.

* * * * *